(12) United States Patent
Yoshino

(10) Patent No.: US 6,505,110 B1
(45) Date of Patent: Jan. 7, 2003

(54) METHOD FOR CONTROLLING BRAKE SYSTEM

(75) Inventor: Masato Yoshino, Itami (JP)

(73) Assignee: Sumitomo (SEI) Brake Systems, Inc., Hisai (JP)

(*) Notice: Subject to any disclaimer, the term of this patent is extended or adjusted under 35 U.S.C. 154(b) by 0 days.

(21) Appl. No.: 10/180,327

(22) Filed: Jun. 27, 2002

(30) Foreign Application Priority Data

Sep. 7, 2001 (JP) .................................. 2001-272334

(51) Int. Cl.$^7$ ............................................... G06F 7/00
(52) U.S. Cl. ............................. 701/71; 701/78; 701/83; 701/96
(58) Field of Search ......................... 701/71, 72, 96, 701/70, 74, 78, 83, 91, 82; 303/163, 165, 167, 186, 189, 901; 180/197

(56) References Cited

U.S. PATENT DOCUMENTS 5,897,601 A * 4/1999 Suzuki ........................ 701/78
6,012,010 A * 1/2000 Batistic et al. ................ 701/72
6,142,587 A * 11/2000 Ohtsu et al. ................ 303/167
6,421,598 B1 * 7/2002 Oshiro ........................ 701/71

FOREIGN PATENT DOCUMENTS

JP  5-19042   3/1993
JP  6-0012229 1/1994
JP  1-138881  5/2001

OTHER PUBLICATIONS

English Language Abstract of JP Appln. No. 5–19042.
English Language Abstract of JP Appln. No. 6–001229.
English Language Abstract of JP Appln. No. 2001–138881.

* cited by examiner

Primary Examiner—Richard M. Camby
(74) Attorney, Agent, or Firm—Greenblum & Bernstein, P.L.C.

(57) ABSTRACT

A brake system control method is provided which makes it possible to carry out ABS control depending on actual road surface conditions in carrying out ABS control while automatic braking is being activated. The control mode of an ABS controller carried out while automatic braking is being activated set at select-low control for both front and rear wheels so that braking forces will act such that slips right and left wheels produced due to actual road surface conditions will be the same. Thus, it is possible to prevent yawing and prevent the steering wheel from getting out of control and to ensure maximum braking force according to the actual road surface conditions.

2 Claims, 2 Drawing Sheets

METHOD FOR CONTROLLING BRAKE SYSTEM

BACKGROUND OF THE INVENTION

This invention relates to a method of controlling a brake system provided with an automatic brake control device an an ABS controller As an automatic vehicle operation device, a constant-speed travelling device has been put to practical use. In recent years, a car-to-car distance maintaining device has been developed in which the vehicle is accelerated and decelerated so as to follow a preceding vehicle. In vehicles carrying such an automatic operating device, besides a conventional brake device operated by the driver, an automatic brake control device is provided which activates automatic braking based on judgment of the automatic operating device.

On the other hand, ABS controllers for anti-skid control are mounted on many vehicles in recent years. Ordinary ABS controllers basically adopt independent control in which braking forces of the wheels are independently controlled according to the slip states of the respective wheels. But some ABS controllers allow to selectively use independent control and select-low control according to the degree of slip of the wheels and the yawing state of the vehicle. In the select-low control, the braking force of one of right, and left wheels that is smaller in slip is controlled so as to conform to the braking force of the other wheel that is greater in slip. Although the braking ability is lower than in the independent control, yawing of the vehicle can be suppressed more.

With a vehicle provided with both an automatic brake control device and an ABS controller, if a slip state of a wheel is detected while automatic braking is being done, ABS control is carried out in independent control. In such a case, if conditions of road surfaces the right and left wheels contact, differ from each other, the steering wheel may become uncontrollable due to the difference in the braking force between the right and left wheels, or the vehicle may yaw. At this time, since the driver, who is not operating the brakes, is not prepared for braking of the vehicle, there is a danger that he may make an error in operating the steering wheel, thus making the vehicle's attitude unstable.

The following three types of measures have been proposed against such a danger in carrying out the ABS control while automatic braking is being done.

The first is to tackle on the automatic brake control device, such as stopping activation of automatic braking while ABS control is being carried out, or keeping constant the brake pressure for automatic braking (JP patent publication 6-1229).

The second is to alarm the driver, specifically judging the activation of automatic braking and the execution of ABS control by an AND circuit to activate an alarm device (JP utility model publication 5-19042).

The third is to tackle on the ABS controller, namely, when carrying out ABS control while automatic braking is being done, it is judged that it is traveling on a low-friction coefficient road where slip tends to occur, and the pressure reduction starting threshold for the wheel speed is set higher than in independent control to quicken the pressure reduction starting timing (JP patent publication 2001-138881). Specifically, there are proposed a method in which the pressure reduction starting threshold for the rear wheels, which has a larger influence on yawing, is set higher than that for the front wheels, and a method in which the pressure reduction starting thresholds of all the wheels in the first control cycle are set high.

In the first method, automatic braking is stopped or suppressed in a situation where deceleration is needed. Thus it accompanies danger of collision or abnormal approach.

The second method in which an alarm is given, may surprise the driver, so that he or she may make an error in operating the steering wheel.

In the third method by the ABS controller, one can expect an effect of suppressing out-of-control of the steering wheel and yawing by carrying out ABS control without surprising the driver while ensuring activation of automatic braking.

But road surfaces on which the vehicle actually travels differ widely. Since in the method described in JP patent publication 2001-138881, it is necessary to evenly set a pressure reduction starting threshold separately from normal independent control, assuming a low friction coefficient road beforehand without grasping the actual road surface conditions, it is difficult to set a proper pressure reduction starting threshold and the pressure reduction starting timing tends to be earlier than necessary under normal road surface conditions.

An object of this invention is to make it possible to carry out proper ABS control depending on the actual road surface conditions while automatic braking is being carried out.

SUMMARY OF THE INVENTION

According to this invention, there is provided a method of controlling a brake system including an automatic brake control device for activating automatic braking based on judgment by a constant-speed travelling device or a car-to-car distance maintaining device, and an ABS controller for controlling the braking forces of individual wheels based on slip states of the wheels, characterized in that if a slip state of the wheel is detected during activation of the automatic braking, control of braking forces by the ABS controller for both of the front and rear wheels is set at select-low control in which the braking force of one of the right and left wheels of which the slip is smaller is controlled in accord with the braking force of the wheel of which the slip is larger.

By setting the ABS control carried out during activation of automatic braking at the select-low control mode for both the front and rear wheels, it is possible to prevent yawing and prevent the steering wheel from getting out of control by applying braking forces such that slips of the right and left wheels produced due to actual road surface conditions will be equal to each other. In the select-low control mode, the braking force is not much different from the one in the independent control mode while there is no or only a small difference in slip of the right and left wheels, that is, while there is little possibility of the steering wheel getting out of control or yawing. Thus it is possible to ensure maximum braking force according to the actual road surface conditions.

If the driver operates the brake during the select-low control, control of the braking force by the ABS controller is set at the independent control in which the braking forces of the right and left wheels are independently controlled, at least for the front wheels. Thus, while the driver is prepared for braking of the vehicle, at least the front wheels, which contribute greatly to the braking force, are set at the independent control. This increases the braking capability.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENT

Figure 1:
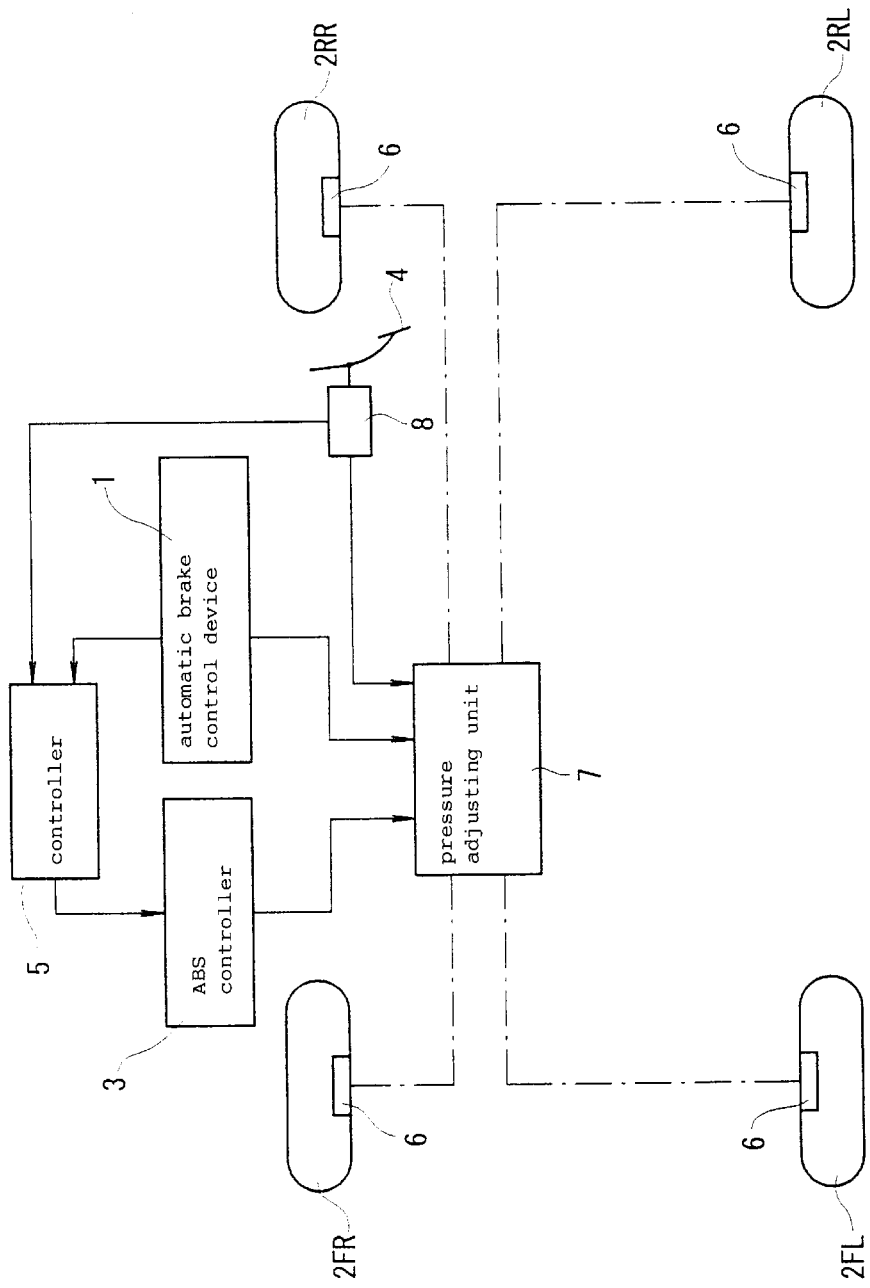
FIG. 1 is a schematic diagram showing a brake system to which the control method according to the present invention is applied.

With reference to the drawings, the embodiment of this invention will be described. FIG. 1 is a schematic diagram of a brake system to which the control method according to the present invention is applied.

The brake system includes Ian automatic brake control device 1 for actuating automatic braking according to the judgment of an automatic operating device (not shown) having the constant-speed travelling function and the car-to-car distance maintaining function, an ABS controller 3 which detects slipping states of front and rear right and left wheels 2FR, 2FL, 2RR and 2RL based on their rotating speeds and controls the brake forces applied thereto, and a controller 5 for monitoring whether or not automatic braking is being activated and whether or not the brake pedal 4 is operated by a driver to determine the control mode of the ABS controller 3.

A pressure adjusting unit 7 for supplying brake hydraulic pressure to wheel cylinders 6 of the wheels 2FR, 2FL, 2RR, 2RL is actuated by the operation of the brake pedal 4 and the automatic brake control device 1, while the brake hydraulic pressures in the wheel cylinders 6 are individually adjusted by the ABS controller 3.

Operation of the brake pedal 4 is detected by watching the hydraulic pressure in a master cylinder 8 as the operating force. A stroke sensor or switch may be coupled to the brake pedal 4 to detect the operation of the brake pedal.

Figure 2:
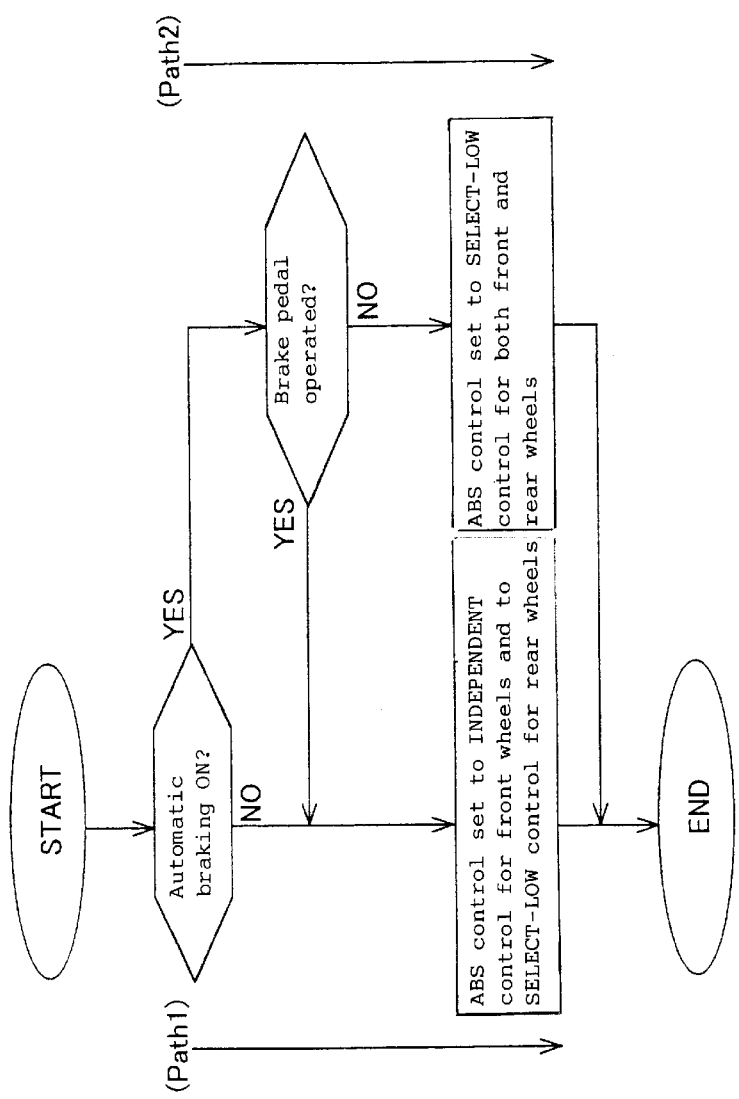
FIG. 2 is a flowchart showing the control logic of the controller of FIG. 1.

FIG. 2 is a flowchart showing logic for determining the control mode of the ABS controller 3 by the controller 5. The controller 5 normally performs interrupt handling to the automatic brake control device 1 to monitor whether or not automatic braking is being activated. While automatic braking is not being activated, it sets the control mode of the ABS control device 3 at independent control for the front wheels and select-low control for the rear wheels (Path 1).

On the other hand, while automatic braking is being activated, it checks whether or not the brake pedal 4 is being operated. If it is not being operated, the control mode of the ABS controller 3 is set at select-low control for both front and rear wheels (Path 2). Also, if the brake pedal 4 is being operated, the mode will be returned to Path 1 in which the control mode for the ABS controller 3 is set at independent control for the front wheels and select-low control for the rear wheels.

By repeating such control flow for every interrupt handling, if ABS control is carried out while automatic braking is on, both front and rear wheels are set at select-low control as long as the brake pedal 4 is not operated. Thus the braking forces of the right and left wheels are adjusted without waste according to the actual road condition. Also, if the brake pedal 4 is operated, assuming that the driver has an intention of braking the vehicle, the ABS control is set at independent control, which is superior in the braking function, for the front wheels only. The ABS control for the rear wheels may also be set at independent control.

In the system diagram shown in FIG. 1, for convenience, the automatic control device 1, ABS controller 3 and controller 5 are shown as independent control units. But two or more functions may be assigned to one unit.

As described above, in the control method for a brake system of this invention, since the control mode of the ABS controller carried out while automatic braking is being activated is set at select-low control for both front and rear wheels so that braking forces will act such that slips of the right and left wheels produced due to actual road surface conditions are the same, it is possible to prevent the steering wheel from getting out of control or yawing and to ensure maximum braking force according to the actual road surface conditions.

Also, if the brake is operated by the driver during the select-low control, control of the braking force by the ABS controller is set at independent control, in which the braking forces of the right and left wheels are independently controlled, at least for the front wheels. Thus, while the driver is prepared for braking of the vehicle, at least the front wheels, which contribute greatly to braking force, are set at independent control. This increases the braking capability.

What is claimed is:

1. A method of controlling a brake system including an automatic brake control device for activating automatic braking based on judgment by a constant-speed travelling device or a car-to-car distance maintaining device, and an ABS controller for controlling the braking forces of individual wheels based on slip states of the wheels, characterized in that if a slip state of the wheel is detected during activation of said automatic braking, control of braking forces by said ABS controller for both of the front and rear wheels is set at select-low control in which the braking force of one of the right and left wheels of which the slip is smaller is controlled in accord with the braking force of the wheel of which the slip is larger.

2. The method of controlling a brake system as claimed in claim 1 wherein during said select-low control, if the brake is operated by the, driver, the control of the braking forces by said ABS controller is set, at least for the front wheels, at independent control in which the braking forces of the right and; left wheels are independently controlled.

* * * * *

UNITED STATES PATENT AND TRADEMARK OFFICE
CERTIFICATE OF CORRECTION

PATENT NO.    : 6,505,110 B1
DATED         : January 7, 2003
INVENTOR(S)   : M. Yoshino It is certified that error appears in the above-identified patent and that said Letters Patent is hereby corrected as shown below:

Title page,
Item [56], References Cited, FOREIGN PATENT DOCUMENTS, "6-0012229" should be -- 6-001229 --.
Item [57], ABSTRACT,
Line 7, after "activated" insert -- is --.
Line 8, after "slips" insert -- of the --.

Column 4,
Line 51, after "and" delete ";".

Signed and Sealed this

Seventh Day of October, 2003

JAMES E. ROGAN
*Director of the United States Patent and Trademark Office*